United States Patent [19]

Rohde et al.

[11] Patent Number: 4,698,073
[45] Date of Patent: Oct. 6, 1987

[54] PROCESS FOR REGENERATION OF ADSORBERS

[75] Inventors: Wilhelm Rohde, Munich; Günter Klein, deceased, late of Neuried, both of Fed. Rep. of Germany

[73] Assignee: Linde Aktiengesellschaft, Wiesbaden, Fed. Rep. of Germany

[21] Appl. No.: 832,791

[22] Filed: Feb. 26, 1986

Related U.S. Application Data

[63] Continuation-in-part of Ser. No. 657,709, Oct. 4, 1984, abandoned.

[30] Foreign Application Priority Data

Oct. 6, 1983 [DE] Fed. Rep. of Germany ....... 3336427

[51] Int. Cl.[4] .................... B01D 53/04; B01D 53/26
[52] U.S. Cl. ............................ 55/33; 55/62; 55/68; 55/75; 55/179; 55/208; 62/18
[58] Field of Search .................. 55/31, 33-35, 55/62, 68, 75, 179, 208; 62/18

[56] References Cited

U.S. PATENT DOCUMENTS

| | | | |
|---|---|---|---|
| 2,675,089 | 4/1954 | Kahle | 55/62 |
| 2,790,505 | 4/1957 | Dow | 55/33 |
| 2,995,208 | 8/1961 | Hachmuth et al. | 55/33 |
| 3,190,343 | 6/1965 | Hussmann | 55/35 X |
| 3,230,689 | 1/1966 | Hussmann | 55/31 X |
| 3,323,288 | 6/1967 | Cheung et al. | 55/62 X |
| 3,405,507 | 10/1968 | Spencer et al. | 55/62 |
| 3,674,429 | 7/1972 | Collins | 55/31 X |
| 3,712,027 | 1/1973 | Hasz | 55/62 X |
| 3,967,464 | 7/1976 | Cormier et al. | 55/62 X |
| 4,030,896 | 6/1977 | Wimber et al. | 55/62 X |
| 4,050,909 | 9/1977 | Ranke | 55/68 |
| 4,092,131 | 5/1978 | Rohde | 55/33 |
| 4,183,734 | 1/1980 | Leppaud et al. | 55/33 X |
| 4,190,423 | 2/1980 | Winter | 55/62 X |
| 4,203,734 | 5/1980 | Winter et al. | 55/62 X |
| 4,324,564 | 4/1982 | Oliker | 55/62 X |
| 4,329,158 | 5/1982 | Sircar | 55/62 X |
| 4,398,927 | 8/1983 | Asher et al. | 55/34 |
| 4,472,178 | 9/1984 | Kumar et al. | 55/62 X |
| 4,473,381 | 9/1984 | Winter | 55/62 X |

Primary Examiner—Robert Spitzer
Attorney, Agent, or Firm—Millen & White

[57] ABSTRACT

Adsorbers are loaded with impurities, removed from a compressed gas stream and are regenerated by a gas heated by the heat of compression of the gas stream. A heat reservoir or accumulator is employed instead of a conventional shell and tube type heat exchanger.

21 Claims, 2 Drawing Figures

PROCESS FOR REGENERATION OF ADSORBERS

This application is a continuation-in-part of application Ser. No. 657,709, filed Oct. 4, 1984, now abandoned.

BACKGROUND OF THE INVENTION

This invention relates to a process for the regeneration of adsorbers loaded with impurities removed from the compressed air, and in particular to a process wherein regeneration is conducted with a hot regeneration gas.

In air rectification the air is compressed, then freed of impurities, particularly water vapor, carbon dioxide, acetylene, and other hydrocarbons in adsorbers and then cooled, partially liquified, and fed to a rectification column. There, the air is separated into a gaseous fraction, essentially containing nitrogen, and a liquid fraction, essentially containing oxygen.

Compression of the air usually is effected by one- or multi-stage compression to a pressure of 5 to 10 bar, typically 5 to 6 bar if nitrogen is withdrawn at about atmospheric pressure from the rectification plant and correspondingly higher if high pressure products are to be produced. As the efficiency of the compressor decreases with increasing compression ratio and, on the other hand, the efficiency of the compressor is an essential item in the overall energy balance of the process, the air usually is compressed under conditions that the compression ratio in each stage of compression is relatively low. For example, compression of ambient air to about 5 to 6 bar may be effected in a three- or four-stage turbo compressor. As a consequence of the relatively low compression ratio, the temperature of the air after each compression stage is relatively low, typically about 80° to 130° C., especially 95° to 125° C.

The adsorbers, typically molecular sieve adsorbers, generally operated by an alternating switching arrangement, are sequentially loaded with impurities from the air and then purified by regeneration gas. Preferably, a separation product, especially nitrogen, from the rectification column is used as the regeneration gas (see, e.g., DE-OS 30 12 062, incorporated by reference herein). The nitrogen is heated to about ambient temperature and divided into two partial streams, one being used as regeneration gas and the other one being withdrawn from the process and used for other purposes. The regeneration gas, after being further heated in an electric heater, is passed through one of the adsorbers to remove the impurities and is withdrawn from the plant as waste gas.

In a subsequent step of the regeneration phase, the heated adsorber is again cooled. For this purpose, the regeneration gas, without being heated, is fed directly to the adsorber, thereby cooling same, and is withdrawn from the adsorber as waste gas. For the purpose of regeneration, usually only a limited amount of regeneration gas is available, typically about 15 to 30% of the low pressure nitrogen.

For the regeneration of the adsorbers, the required high temperature for the regeneration gas has involved the use of heat exchangers having very large heating surfaces, resulting in large pressure drops and requiring a considerable expenditure of energy.

In a known process, the regeneration gas temperature is in the order of 150° to 300° C. In this process, which is disclosed in U.S. Pat. No. 4,329,158 of SIRCAR, the regeneration gas is heated by indirect heat exchange with compressed feed air having a temperature of 150° to 300° C. The whole amount of waste gas from an air separation plant, i.e. the whole nitrogen content of the air, is used as regeneration gas in this process. It is obvious that regeneration of an adsorber is easy in case of such high regeneration gas temperature and such large amounts of regeneration gas.

SUMMARY OF THE INVENTION

An object of this invention is to provide an improved process of the type mentioned supra, so that heating of the regeneration gas can be conducted with less expenditure in energy and/or investment costs.

Another object is to regenerate an adsorber by utilizing the heat obtained in the compression of air.

A still further object is to regenerate an adsorber at relatively low temperature with a relatively small amount of regeneration gas.

Upon further study of the specification and appended claims, further objects and advantages of this invention will become apparant to those skilled in the art.

To attain the objects of this invention, a minor portion of compressed air, at a temperature in the range of 80° to 130° C., is conducted through a heat reservoir for a period of time at least sufficient to raise the temperature of the heat reservoir air outlet end to substantially the temperature of the compressed air and then terminating the flow of compressed air through the heat reservoir. During the heat regeneration phase of the adsorber, the low-pressure regeneration gas is conducted through the heat reservoir and thereby heated to a temperature not more than 4° C. below the temperature of the compressed air, and thereafter passed through the adsorber.

To conduct the regeneration of an adsorber at the relatively low temperature level of 80° to 130° C. as provided by the air compression, it is essential that the regeneration gas is heated to as close the temperature of the compressed air as is possible. Due to the fact that the regeneration gas itself is at low pressure, it is not acceptable to provide an indirect heat exchange between compressed air and regeneration gas because of the relatively large pressure drop occuring in a suitable heat exchanger. Therefore, according to the invention, the regeneration gas is heated in a heat accumulator or heat reservoir (regenerator) against an intermediate body such as heated liquid, e.g. water, or preferably a heated packing. For this purpose, a part of the heat of the compressed hot air is stored in a heat reservoir which is heated under unusual conditions inasmuch as hot compressed air is passed therethrough until the whole heat reservoir is heated to substantially the temperature of the compressed air, i.e. until the compressed air is not cooled anymore by passing through the heat reservoir.

This specific mode of operation of the heat reservoir results in a substantial uniform temperature of the regeneration gas during a hot regeneration phase, which is shorter than the phase of heating the heat reservoir. An advantage of the inventive process is that the heat of the compressed air can be recovered with only very small temperature differences such temperature differences being generally below 4° C., preferably below 3° C., and more preferably even below 2° C., e.g. at about 1° C., and at very low pressure drops of the regeneration gas, e.g. below 0.1 bar, preferably below 0.05 bar, more preferably 100 mm of water gauge, especially below 50 mm below water gauge. The low pressure drop of the regeneration gas is an important item of the process as the pressure level of the regeneration gas, prior to heating, is low, usually below 1.5 bar, especially below 1.2 bar, and the regeneration gas shall be removed from the plant at about atmospheric pressure without using a blower or the like.

The amount of regeneration gas usually is in the range of 15 to 30%, preferably about 20% of the amount of air to be purified. The residual amount of nitrogen rich gas obtained in the air rectification is generally needed for other purposes and is not available for regeneration purposes.

According to a preferred embodiment of the invention, the amount of the compressed air which is conducted through the heat reservoir during a heating period thereof is about 15 to 30% of the compressed air.

According to another preferred embodiment of the invention, the heated low-pressure regeneration gas is conducted through the adsorber during 15 to 40% of the time for regeneration and the cooling time of the adsorber is about 40 to 75% of the regeneration time. As the hot-gas regeneration phase generally is shorter than the cooling phase, it is possible, according to a further preferred embodiment of the invention, to reheat the heat reservoir during the cooling period of the adsorber which previously has undergone its hot-gas regeneration phase. In such an embodiment of the invention, the heat reservoir generally is reheated completely before the cooling phase is terminated. As this means that the duration of one working cycle of the heat reservoir, comprising one cooling and one heating phase, is not longer than the regeneration phase of an adsorber, it is possible to provide only one heat reservoir when using two cyclically switchable adsorbers.

In a further embodiment of the invention, a minor portion of the hot regeneration gas is superheated to a temperature higher than that provided by the heat of compression and thereafter passed through the adsorber at the end of the heating period, thereby superposing a heat pulse on the normal heating process.

This embodiment of the process further offers the advantage that traces impurities are removed from the adsorber with greater certainty. By "heat pulse" is meant the treatment of the adsorber with a gas heated to a temperature at least 25° C., preferably at least 50° C. higher than the temperature obtained by the heat of compression alone, this treatment being conducted for about the last 5 to 20%; preferably 10 to 15% of the heating period of treatment with hot regeneration gas.

If a malfunction occurs in the process, for example, it can happen that the adsorber packing loses its effectiveness. To regain approximately the same adsorption characteristics, the adsorber would ordinarily have to be regenerated several times with a gas having a regeneration temperature obtained from the compression heat. This leads to considerable delays until the adsorber packing is revitalized. In order to overcome such undesirable delay, it is necessary in many instances for the plant to be equipped with a heater to provide a heat pulse, and therefore this further embodiment of the invention regarding superposition of a heat pulse on the heating process usually does not require further equipment.

BRIEF DESCRIPTION OF THE DRAWINGS

In the attached Figures

DETAILED DESCRIPTION

Figure 1:
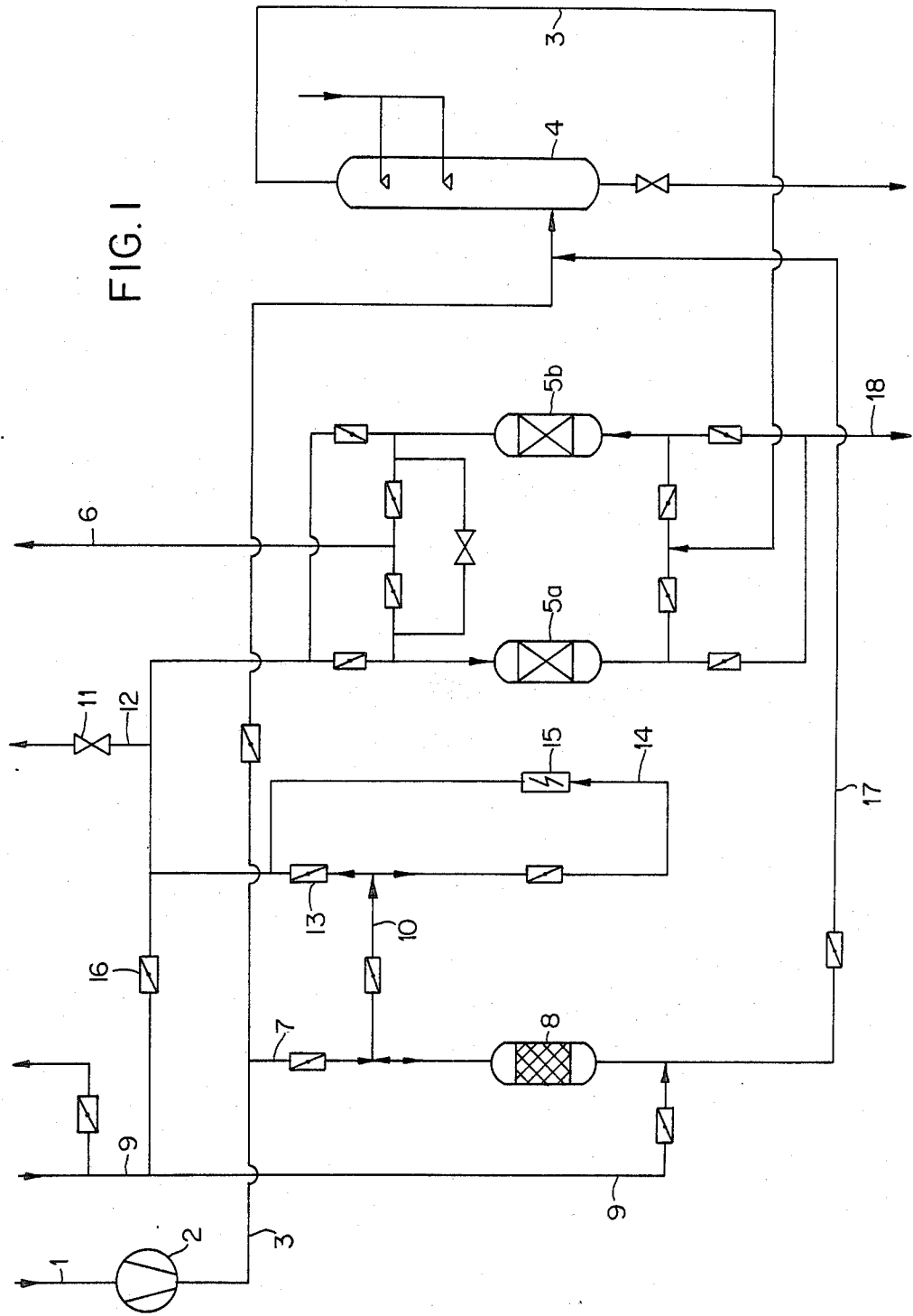
FIG. 1 is a schematic flowsheet of a preferred comprehensive embodiment of the invention and in FIG. 2 a process cycle of the plant disclosed in FIG. 1 is shown.

Air to be separated, 226,000 Nm$^3$/h, is brought in by pipe 1 and compressed in a compressor 2 to 5.82 ata (atmoshperes, absolute). The temperature of the compressed air is 122° C. The air for the most part, namely 186,000 Nm$^3$/h, is fed by pipe 3 to a cooling station 4, which, e.g., is designed as a water spray cooler, and cooled to about 20° C. The air is then passed to two alternately loaded or regenerated molecular sieve adsorbers 5a, 5b, in which, primarily water, $CO_2$ and acetylene are separated from the air. The purified air is then fed by a pipe 6 to a separation apparatus (not shown), e.g., a rectification column.

The smaller partial stream of hot, compressed air (40,000 Nm$^3$/h) is branched off by pipe 7 and fed to a heat reservoir 8. Charging of the heat reservoir lasts about 65 min. The pressure drop in the heat reservoir is only about 50 mm water gauge. The heat reservoir is completely heated during the charging, i.e., at the end of the charging the temperature is about the same, e.g., 120° C., at the inlet and outlet. During discharging, the outlet temperature of the regeneration gas remains approximately constant. In this case a quartzite stone or metal packing is used.

At the beginning of regeneration about 49,400 Nm$^3$/h of regeneration gas with a pressure of 1.14 ata, brought by pipe 9 from the air separation apparatus (not shown), is fed through heat reservoir 8. For example, gaseous nitrogen having a temperature of 10° C. is involved. During the discharging of heat reservoir 8, which occurs by pipe 17, the regeneration gas is heated to 118° C. The pressure drop in the heat reservoir is 400 mm water gauge. The hot gas flows for about 5 minutes through regeneration gas conduit 10 and into the open air through valve 11 disposed in pipe 12 just upstream from the inlet to the adsorbers. As a result, impurities in the heat reservoir and conduit are flushed out and at the same time the conduit is preheated. Then 49,400 Nm$^3$/h of regeneration gas at 118° C. flows through the adsorbers for about 28 minutes, heats the packing and strips off most of the impurities. At the end of this period, by closing of a valve 13 with simultaneous reduction of the amount of gas to 25,000 Nm$^3$/h and turning on a heater 15 placed in bypass 14, the regeneration gas is heated from 118° C. to 158° C. before entering the adsorber and for about another 6 minutes is fed through the adsorbers. After that, the heating is ended and the regeneration gas (49,500 Nm$^3$/h) is fed, unheated, via valve 16 to the adsorber. The cold (10° C.) regeneration gas drives the hot wave through the packing with the peak heating and completes the regeneration after another 54 minutes. The regeneration gas is passed into the atmosphere via pipe 18. During the cooling and reversing phase, the heat reservoir is heated again for 65 minutes with 40,000 Nm$^3$/h hot compress air from pipe 3.

Figure 2:
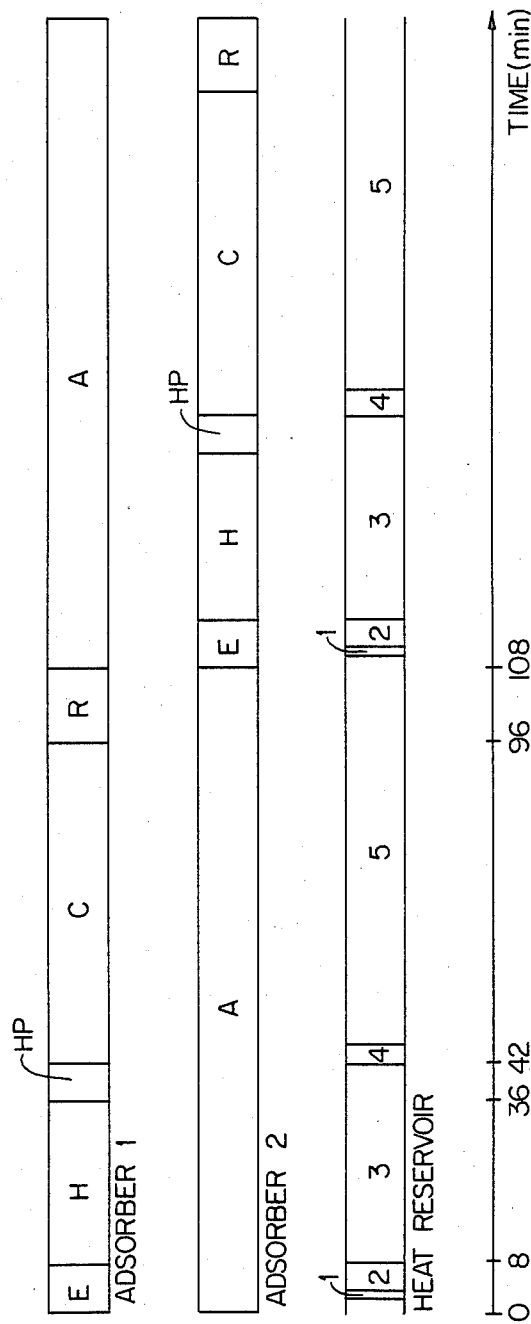

Additional detail of the switching cycle can be gathered from FIG. 2.

Heat balance

In 5 minutes of flushing and 31 minutes of heating, the regeneration gas takes up $$Q = 49,400 \cdot 60/36 \cdot 0.31 \cdot 108 = 993,000 \text{ kcal.}$$

The air for charging contains between 10° and 120° C. in 65 minutes $$Q = 40{,}000 \cdot 60/65 \cdot 0.31 \cdot 110 = 1{,}477{,}000 \text{ kcal.}$$

A heat surplus of 484,000 kcal results therefrom in charging the heat reservoir. The heat surplus results from an appropriate arrangement of the heat reservoir with corresponding pressure drop for the air portion for charging and for the amount of regeneration gas.

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. In a process for the regeneration of an adsorber loaded with impurities removed from air by passing a stream of hot low-pressure regeneration gas through the adsorber, the improvement being wherein one- or multi-step compression of the air is effected such that the temperature of the air after each compression step is in the range of 80° to 130° C.; wherein a minor portion of compressed air is conducted through a heat reservoir for a period of time at least sufficient to raise the temperature of the heat reservoir air outlet end to substantially the temperature of the compressed air and then terminating the flow of compressed air through the heat reservoir; and wherein the low-pressure regeneration gas, during a hot gas regeneration phase of the adsorber, is conducted through the heat reservoir and thereby heated to a temperature not more than 4° C. below the temperature of the compressed air, and thereafter passed through the adsorber.

2. A process according to claim 1, wherein the regeneration gas, during passage through the heat reservoir, is heated to a temperature not more than 3° C. below the temperature of the compressed air.

3. A process according to claim 2, wherein the compression of the air is effected by multi-step compression and the temperature of the air after each compression stage is in the range of 95° to 125° C.

4. A process according to claim 1, wherein the regeneration gas, during passage through the heat reservoir, is heated to a temperature not more than 2° C. below the temperature of the compressed air.

5. A process according to claim 4, wherein the compression of the air is effected by multi-step compression and the temperature of the air after each compression stage is in the range of 95° to 125° C.

6. A process according to claim 1, wherein the compression of the air is effected by multi-step compression and the temperature of the air after each compression stage is in the range of 95° to 125° C.

7. A process according to claim 1, wherein the pressure drop of the regeneration gas during passage through the heat reservoir is less than 0.1 bar.

8. A process according to claim 1, wherein the pressure drop of the regeneration gas during passage through the heat reservoir is less than 0.05 bar.

9. A process according to claim 1, wherein the pressure of the regeneration gas is below 1.5 bar.

10. A process according to claim 1, wherein the pressure of the regeneration gas is below 1.2 bar.

11. A process according to claim 1, wherein said minor portion of compressed air is 15 to 30% of the compressed air 12. A process according to claim 1, wherein the amount of regeneration gas is in the range of 15 to 30% of the amount of air to be purified.

13. A process according to claim 1, wherein the hot low-pressure regeneration gas is conducted during 15 to 40% of the time for regeneration through the adsorber and a cooling time of 40 to 75% of time for regeneration is provided for.

14. A process according to claim 1, wherein the heat reservoir is loaded by compressed air at least partly during the cooling period of an adsorber after its hot gas regeneration phase.

15. A process according to claim 14, wherein two adsorbers and one heat reservoir are provided for, the adsorbers being switched cyclically between adsorption and regeneration phases.

16. A process according to claim 1, wherein a minor portion of the regeneration gas conducted through heat reservoir is superheated to a temperature higher than that provided by the heat of compression and passing resultant superheated gas through the adsorber at the end of the heating period.

17. A process according to claim 16, wherein the regeneration gas is superheated for about the last 5 to 20% of the hot gas regeneration period.

18. A process according to claim 16, wherein the regeneration gas is superheated for about the last 10 to 20% of the hot gas regeneration phase.

19. A process according to claim 16, wherein the regeneration gas is superheated to a temperature about 25° to 50° C. higher than the temperature provided by the heat of compression.

20. A process according to claim 1, wherein the pressure drop of the regeneration gas during passage through the heat reservoir is less than 100 mm of water gauge.

21. In a process for the separation of air by low-temperature fractionation with a purification of air by adsorption in at least two cyclically switchable adsorbers and a two-stage low-temperature air fractionation including a high-pressure rectification column and a low-pressure rectification column; with a recovery of a nitrogen fraction from the top of the low-pressure rectification column and using part of said low-pressure nitrogen fraction for the regeneration of an adsorber loaded with impurities previously removed from air by conducting hot nitrogen through the adsorber, the improvement being wherein one or multi-step compression of the air is effected such that the temperature of the air after each compression step is in the range of 80° to 130° C.; wherein a minor portion of compressed air is conducted through a heat reservoir for a period of time at least sufficient to raise the temperature of the heat reservoir air outlet end to substantially the temperature of the compressed air and then terminating the flow of compressed air through the heat reservoir; and wherein the low-pressure nitrogen is heated, by passage through the heat reservoir, to a temperature not more than 4° C. below the temperature of the compressed air, and thereafter is passed through the adsorber.

* * * * *